US010004210B1

(12) United States Patent
Laz

(10) Patent No.: US 10,004,210 B1
(45) Date of Patent: Jun. 26, 2018

(54) AQUARIUM VACUUM

(71) Applicant: Stanley Laz, Snohmish, WA (US)

(72) Inventor: Stanley Laz, Snohmish, WA (US)

( * ) Notice: Subject to any disclaimer, the term of this patent is extended or adjusted under 35 U.S.C. 154(b) by 10 days.

(21) Appl. No.: 15/290,474

(22) Filed: Oct. 11, 2016

(51) Int. Cl.
A01K 63/04 (2006.01)
C02F 1/00 (2006.01)
A01K 61/00 (2017.01)
C02F 1/28 (2006.01)
A01K 63/00 (2017.01)
C02F 103/22 (2006.01)

(52) U.S. Cl.
CPC .......... A01K 61/003 (2013.01); A01K 63/006 (2013.01); A01K 63/045 (2013.01); A01K 63/047 (2013.01); C02F 1/001 (2013.01); C02F 1/283 (2013.01); C02F 2103/22 (2013.01)

(58) Field of Classification Search
CPC .. A01K 61/003; A01K 63/006; A01K 63/045; A01K 63/047; C02F 1/001; C02F 1/283; C02F 2103/22
USPC ................ 210/167.21, 167.27, 416.1, 416.2; 15/50.1; 119/259
See application file for complete search history.

(56) References Cited

U.S. PATENT DOCUMENTS

| 2,899,063 | A | | 8/1959 | Ellis | |
| 5,093,955 | A | * | 3/1992 | Blehert | A47L 11/24 15/320 |
| 5,240,596 | A | | 8/1993 | Chestnut | |
| 5,319,828 | A | * | 6/1994 | Waldhauser | A47L 11/302 15/320 |
| 5,975,022 | A | * | 11/1999 | Miller | A01K 63/006 119/264 |
| 7,097,046 | B2 | | 8/2006 | Calabrese | |
| 2009/0045143 | A1 | | 2/2009 | Getsinger | |
| 2014/0261540 | A1 | * | 9/2014 | Renaud | E04H 4/1654 134/6 |

FOREIGN PATENT DOCUMENTS

EP 0527580 A2 2/1993

* cited by examiner

Primary Examiner — Fred Prince
(74) Attorney, Agent, or Firm — Kyle A. Fletcher, Esq.

(57) ABSTRACT

The aquarium vacuum is a cleaning device adapted for use with aquarium. The aquarium vacuum is adapted for use in cleaning algae from the walls and corners of an aquarium while water is in the aquarium. The aquarium vacuum comprises a scrubbing device, a pump, and a filtration unit. The scrubbing device is used to remove the algae from the aquarium wall and corner. Algae released from the aquarium wall is drawn into the filtration unit with the pump. The filtration unit removes the algae and other particulate matter from the water before returning the processed water back to the aquarium.

17 Claims, 5 Drawing Sheets

AQUARIUM VACUUM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of animal husbandry including the care of live fish, more specifically, a water treatment arrangement adapted for use with receptacles for live fish.

SUMMARY OF INVENTION

The aquarium vacuum is a cleaning device adapted for use with aquarium. The aquarium vacuum is adapted for use in cleaning algae from the walls and corners of an aquarium while water is in the aquarium. The aquarium vacuum comprises a scrubbing device, a pump, and a filtration unit. The scrubbing device is used to remove the algae from the aquarium wall and corner. Algae released from the aquarium wall or corner is drawn into the filtration unit with the pump. The filtration unit removes the algae and other particulate matter from the water before returning the processed water back to the aquarium.

These together with additional objects, features and advantages of the aquarium vacuum will be readily apparent to those of ordinary skill in the art upon reading the following detailed description of the presently preferred, but nonetheless illustrative, embodiments when taken in conjunction with the accompanying drawings.

In this respect, before explaining the current embodiments of the aquarium vacuum in detail, it is to be understood that the aquarium vacuum is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aquarium vacuum.

It is therefore important that the claims be regarded as including such equivalent construction insofar as they do not depart from the spirit and scope of the aquarium vacuum. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
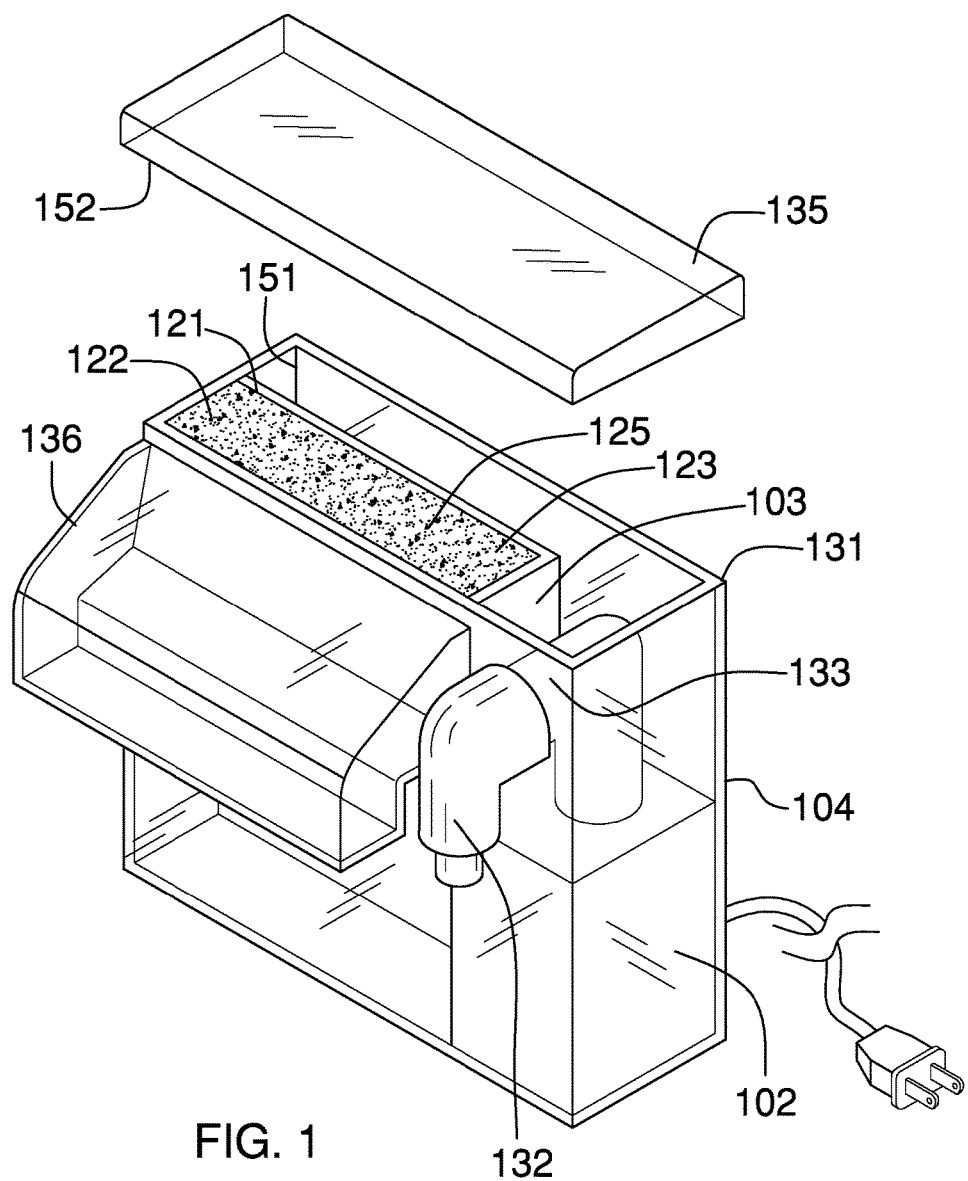
FIG. 1 is a perspective view of an embodiment of the disclosure.
Figure 2:
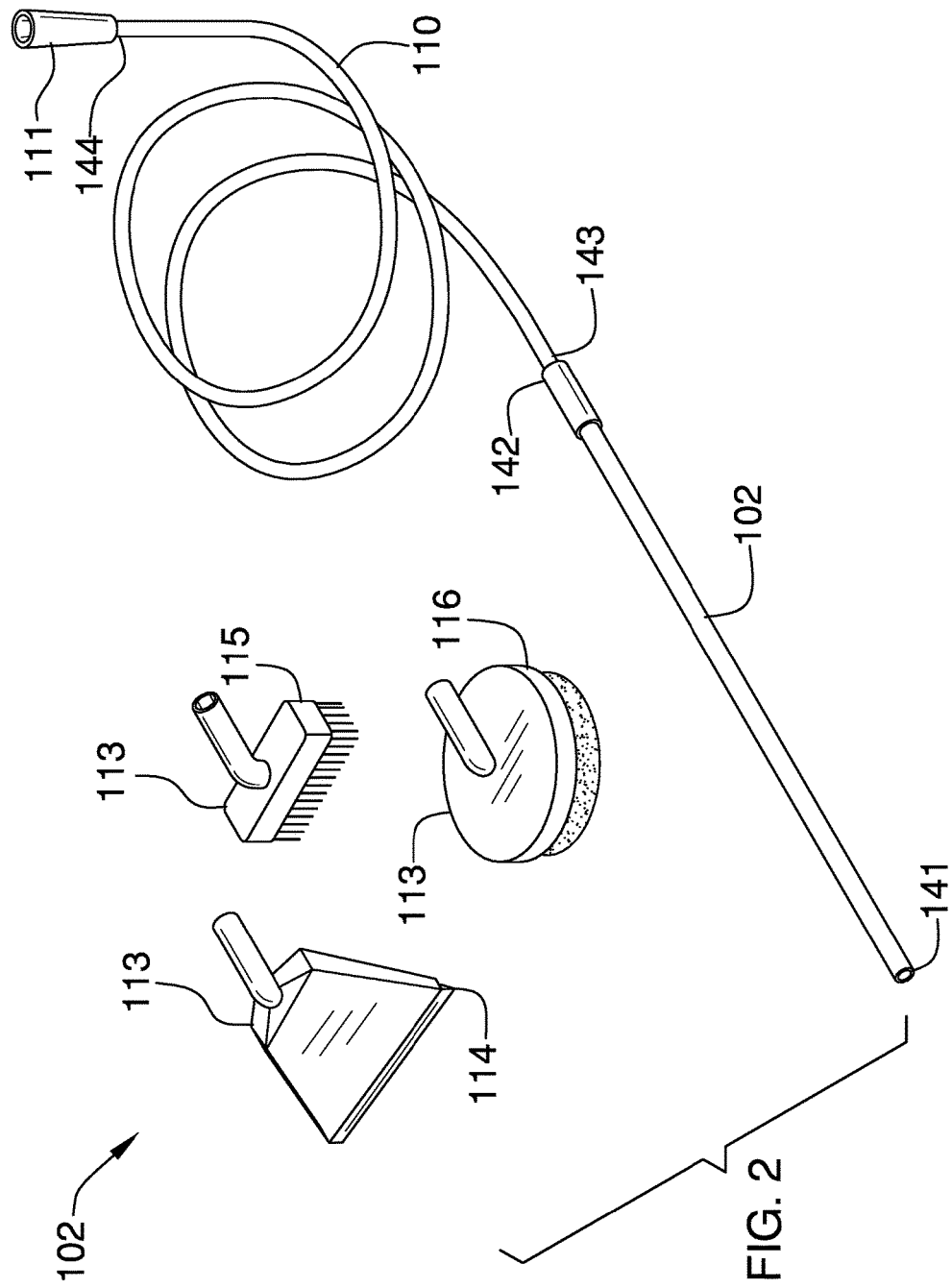
FIG. 2 is a detail view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The aquarium vacuum 100 (hereinafter invention) comprises a scrubbing device 101, a pump 102, a filtration unit 103, and a housing 104. The scrubbing device 101 attaches to the pump 102. The pump 102 and the filtration unit 103 are contained within the housing 104. The invention 100 is a cleaning device adapted for use with an aquarium 161. The aquarium 161 is further defined with a plurality of walls 162. The invention 100 is adapted for use in cleaning algae 165 from the plurality of walls 162 and corners of the aquarium 161 while water 163 is in the aquarium 161. The scrubbing device 101 is used to remove the algae 165 from the plurality of walls 162 and corners of the aquarium 161. Algae 165 released from the plurality of walls 162 and corners of the aquarium 161 is transported into the filtration unit 103 by the pump 102. The filtration unit 103 removes the algae 165 and other particulate matter from the water 163 before returning the processed water 164 back to the aquarium 161. Removing algae 165 from the water 163 as the algae 165 is removed from a wall or corner selected from the plurality of walls 162 or corners improves the overall cleanliness of the aquarium 161 and reduces the environmental stresses placed on the ecosystem maintained within the aquarium 161.

The pump 102 is a commercially available pump that draws water 163 and algae 165 through the scrubbing device 101 and transports the drawn water 163 and algae 165 to the filtration unit 103. The required pumping capacity of the pump 102 will be a function of the volume of the aquarium 161. It is the opinion of the applicant that the selection of a two to three gallon per minute pump for use as the pump 102 is adequate for most aquariums 161.

The housing 104 comprises a container 131, second connector 132, a pump intake 133, a pump outlet 134, a cover 135, and an exit port 136. The second connector 132 and the exit port 136 are mounted on the exterior of the container 131. The pump intake 133 and the pump outlet 134 are contained within the container 131. As shown most clearly in FIGS. 1 and 3, the container 131 is a first hollow rectangular block with a first open face 151 within which the pump 102 and the filtration unit 103 is contained. The first open face 151 is a face of the first hollow rectangular block that is formed without a barrier such that the pump 102 and the filtration unit 103 can be accessed for maintenance. The first open face 151 is further defined with an outer dimension. The cover 135 is a second hollow rectangular block that is formed with a second open face 152. The second open face 152 is a face of the second hollow rectangular block that is formed without a barrier. The second open face 152 if further defined with an inner dimension. The inner dimension of the second open face 152 is greater than the outer dimension of the container 131 such that the second open face 152 of the cover 135 can be placed over the first open face 151 of the container 131 in a manner that encloses the interior space of the container 131. The second connector 132 is a rigid tube that is mounted through the surface of the container 131 such that water 163 can be pumped from the exterior of the container 131 into the pump 102.

Figure 3:
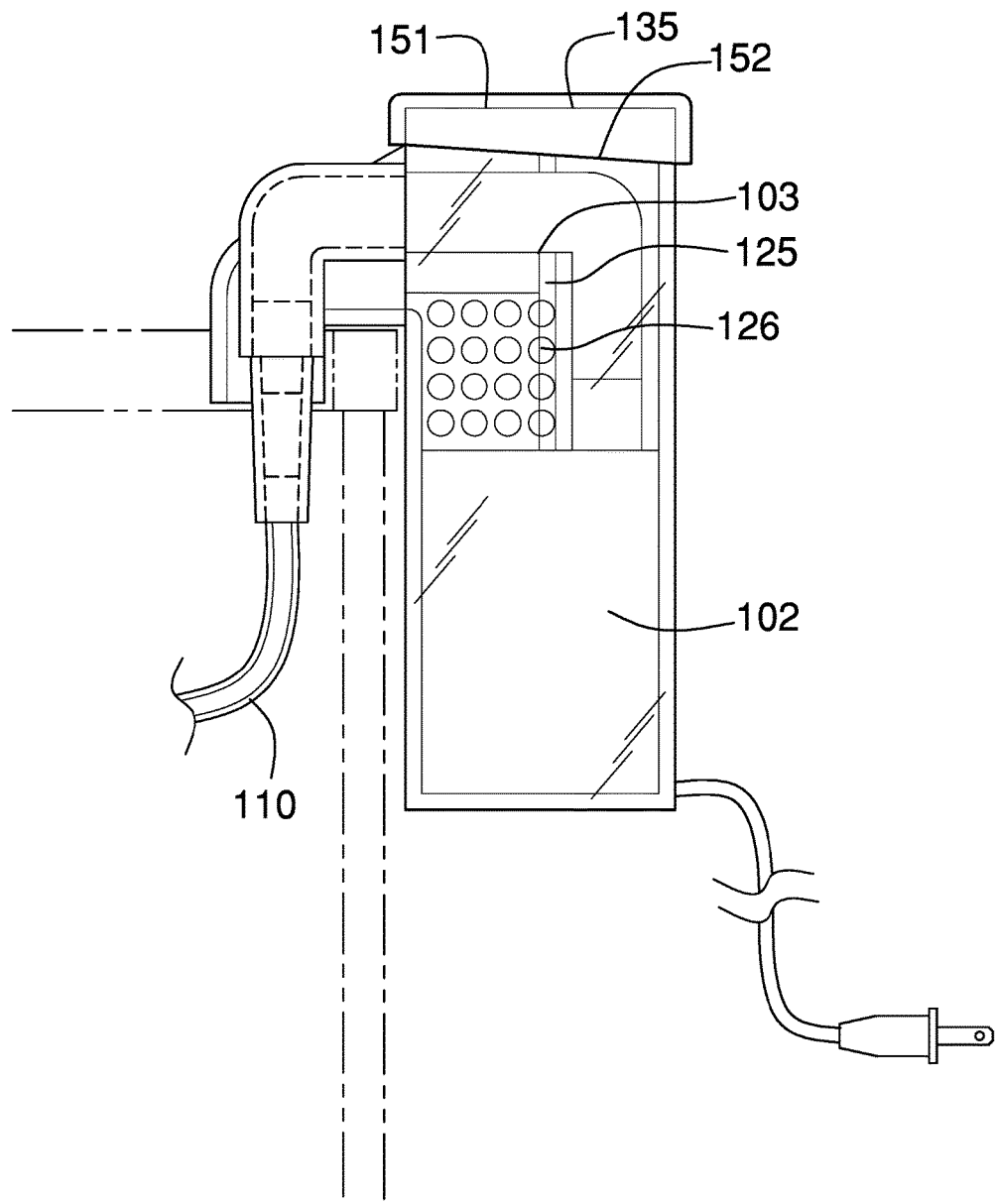
FIG. 3 is a side view of an embodiment of the disclosure.
Figure 4:
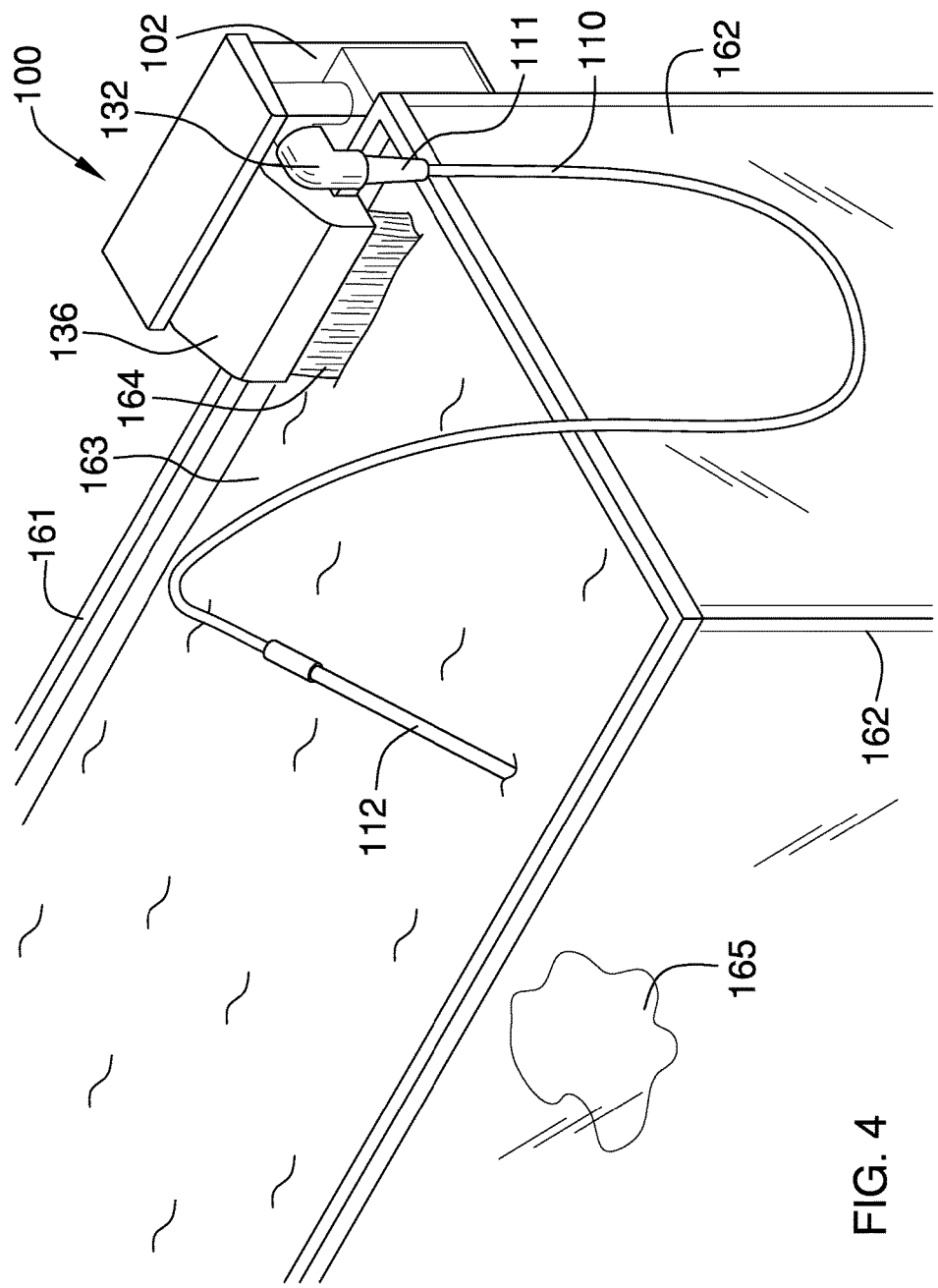
FIG. 4 is an in use view of an embodiment of the disclosure.
Figure 5:
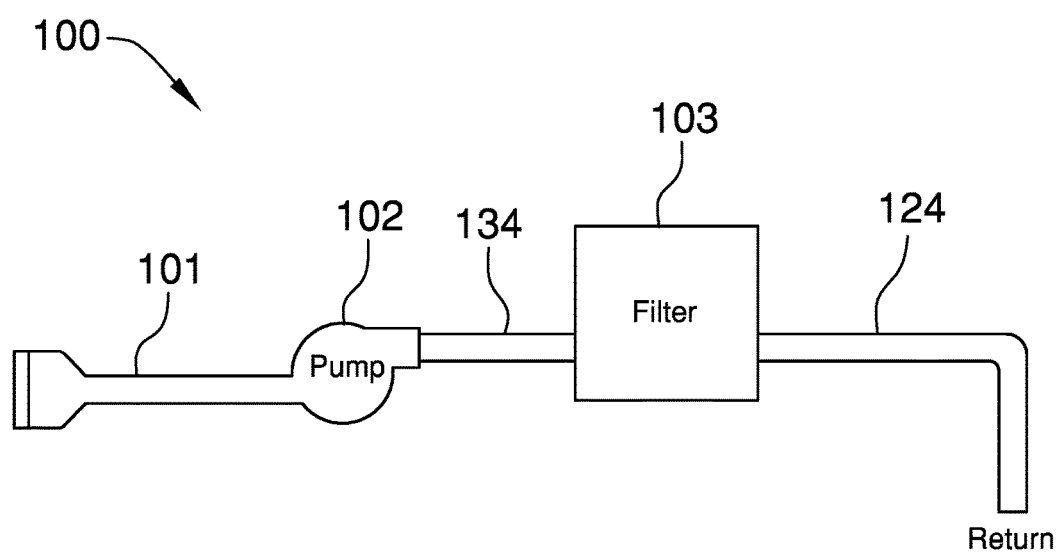
FIG. 5 is a schematic view of an embodiment of the disclosure.

As shown most clearly in FIGS. 1 and 3, the second connector 132 is formed with a 90 degree elbow such that the second connector 132 forms a first L shaped hook. The exit port 136 is a hollow rectilinear structure that is mounted on the exterior of the container 131. The exit port 136 is attached to the same surface as the second connector 132. As shown most clearly in FIGS. 3 and 4, the exit port 136 forms a second L shaped hook such that the housing 104 can be hooked onto the edge of the aquarium 161 using the first L shaped hook of the second connector 132 and the second L shaped hook of the exit port 136. Within the housing 104, the pump intake 133 connects to the second connector 132 such that water 163 will flow through the second connector 132 into the pump 102. The pump outlet 134 transports water 163 from the pump 102 to the filtration unit 103.

The scrubbing device 101 further comprises a hose 110, a first connector 111, a pipe 112, and a plurality of cleaning heads 113. The pipe 112 is further defined with a first end 141 and a second end 142. The hose 110 is further defined with a third end 143 and a fourth end 144. The third end 143 of the hose 110 attaches to the second end 142 of the pipe 112. A cleaning head selected from the plurality of cleaning heads 113 attaches to the first end 141 of the pipe 112. The fourth end 144 of the hose 110 attaches to the first connector 111. The pipe 112 and the hose 110 draw and transport water 163 from the aquarium 161 through the scrubbing device 101 into the housing 104.

To use the scrubbing device 101, a cleaning head selected from the plurality of cleaning heads 113 is attached to the first end 141 of the pipe 112. The first connector 111 attaches to the second connector 132 of the housing 104. While the pump 102 is operating, the cleaning head selected from the plurality of cleaning heads 113 is inserted into the water 163 contained within the aquarium 161 and is rubbed against a wall or corner selected from the plurality of walls 162 or corners of the aquarium 161. The contact of the selected cleaning head is designed to remove algae 165 from the selected wall or corner. The removed algae 165 is captured along with the water 163 drawn by the pump 102 through the pipe 112 and the hose 110 into the housing 104 where the algae 165 will be removed by the filtration unit 103. The cleaning mechanism of the selected cleaning head is described elsewhere in this disclosure. It is preferred that the pipe 112 be a rigid structure or semi-rigid elastic structure and that the hose 110 be a flexible structure.

The plurality of cleaning heads 113 further comprises a vacuum head 114, a scrubbing brush 115, and a polishing and scrubbing brush 116. As shown most clearly in FIG. 2, the vacuum head 114 is a hollow tapered structure that targets the location within the aquarium 161 from which the water 163 is drawn into the scrubbing device 101. The scrubbing brush 115 is a brush through which the water 163 is drawn into the scrubbing device 101. The bristles of the scrubbing brush 115 act as an abrasive that is used to dislodge algae 165 from the plurality of walls 162 or corners. The polishing and scrubbing brush 116 is a soft filtering structure through which the water 163 is drawn into the scrubbing device 101. The polishing and scrubbing brush 116 is used to remove stains and algae from the plurality of walls 162.

The filtration unit 103 is a gravity fed particulate filter unit that receives water 163 from the pump 102, removes the algae 165 and other particulates from the water 163 and returns processed water 164 into the aquarium 161. The filtration unit 103 further comprises a filter chamber 121, one or more filter media 122, and a filter intake 123 and a filter outlet 124. The filter chamber 121 is a hollow rectangular block through which the water 163 is filtered. The one or more filter media 122 is a filtering medium through which the water 163 passes for processing. Filtering medium suitable for use with aquarium 161s 161 are commonly and readily available. In the first potential embodiment of the disclosure, the one or more filter media 122 comprises a readily and commercially available bonded filter pad 125, also commonly referred to as a dual density filter pad, laid on top of an activated carbon filter media 126 contained within a medium bag.

Water 163 is pumped into the filtration unit 103 through the filter intake 123. Water processed 164 by the one or more filter media 122 flows through the filter outlet 124 into the exit port 136, which transports the processed water 164 back into the aquarium 161.

To use the invention 100, the invention 100 is hung from the edge of the aquarium 161. A cleaning head selected from the plurality of cleaning heads 113 is attached to the first end 141 of the pipe 112. The selected cleaning head is inserted into the water 163, the pump 102 is started, and the selected cleaning head is used to clean the plurality of walls 162 and corners.

The following definitions were used in this disclosure:

Bed Filter: As used in this disclosure, a bed filter comprises a particulate material through which a fluid is passed such that particulate material captures solids contained within the fluid while allowing the fluid itself to pass through the particulate matter.

Brush: As used in this disclosure, a brush is a device comprising a plurality of bristles set into a handle or a base that is used for sweeping, smoothing, scrubbing, or painting.

Elastic: As used in this disclosure, an elastic is a material or object that deforms when a force is applied to it and that is able to return to its original shape after the force is removed. A material that exhibits these qualities is also referred to as an elastomeric material.

Exterior: As used in this disclosure, the exterior is use as a relational term that implies that an object is not contained within the boundary of a structure or a space.

Filter: As used in this disclosure, a filter is a mechanical device that is used to separate solids that are suspended in a liquid or a gas.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is use as a relational term that implies that an object is contained within the boundary of a structure or a space.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pipe: As used in this disclosure, a pipe is a hollow cylindrical device that is used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Pump: As used in this disclosure, a pump is a mechanical device that uses suction or pressure to raise or move liquids, compress gases, or force a gas into an inflatable object.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rigid Structure: As used in this disclosure, a rigid structure is a solid structure that is inflexible and will not deform before breaking under a force.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the filter through several filter surfaces in one filtration unit.

Taper: As used in this disclosure, a taper is a continuous, and typically but not necessarily gradual, change in the span of a one or more dimensions of an elongated object that occurs in the apparent direction of elongation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A water treatment apparatus comprising:
a scrubbing device, a pump, and a filtration unit;
wherein the scrubbing device attaches to the pump;
wherein the water treatment apparatus is a cleaning device adapted for use with an aquarium;
wherein the aquarium is further defined with a plurality of walls;
wherein the water treatment apparatus is adapted for use in cleaning algae;
wherein the scrubbing device is used to remove the algae from the aquarium;
wherein algae removed from the plurality of walls and corners of the aquarium is transported into the filtration unit by the pump;
wherein the filtration unit removes the algae from the water;
wherein the filtration unit returns the processed water back to the aquarium;
wherein the pump draws water and algae through the scrubbing device and transports the drawn water and algae to the filtration unit;
wherein the water treatment apparatus further comprises a housing;
wherein the pump and the filtration unit are contained within the housing;
wherein the housing comprises a container, second connector, a pump intake, a pump outlet, a cover, and an exit port;
wherein the second connector and the exit port are mounted on the exterior of the container;
wherein the pump intake and the pump outlet are contained within the container.

2. The water treatment apparatus according to claim 1
wherein the container is a first hollow rectangular block with a first open face within which the pump and the filtration unit is contained;
wherein the first open face is a face of the first hollow rectangular block that is formed without a barrier;
wherein the first open face is further defined with an outer dimension;
wherein the cover is a second hollow rectangular block that is formed with a second open face;
wherein the second open face is a face of the second hollow rectangular block that is formed without a barrier;
wherein the second open face is further defined with an inner dimension.

3. The water treatment apparatus according to claim 2 wherein the inner dimension of the second open face is greater than the outer dimension of the container such that the second open face of the cover can be placed over the first open face of the container in a manner that encloses the interior space of the container.

4. The water treatment apparatus according to claim 3
wherein the second connector is a rigid tube that is mounted through the surface of the container such that water can be pumped from the exterior of the container into the pump;
wherein the second connector is formed with a 90 degree elbow such that the second connector forms a first L shaped hook.

5. The water treatment apparatus according to claim 4
wherein the exit port is a hollow rectilinear structure that is mounted on the exterior of the container;

wherein the exit port is attached to the same surface as the second connector;

wherein the exit port forms a second L shaped hook.

6. The water treatment apparatus according to claim 5 wherein the housing can be hooked onto the edge of the aquarium using the first L shaped hook of the second connector and the second L shaped hook of the exit port.

7. The water treatment apparatus according to claim 6 wherein the pump intake connects to the second connector such that water flows through the second connector into the pump.

8. The water treatment apparatus according to claim 7 wherein the pump outlet transports water from the pump to the filtration unit.

9. The water treatment apparatus according to claim 8
wherein the scrubbing device further comprises a hose, a first connector, a pipe, and a plurality of cleaning heads;
wherein the pipe is further defined with a first end and a second end;
wherein the hose is further defined with a third end and a fourth end;
wherein the third end of the hose attaches to the second end of the pipe;
wherein a cleaning head selected from the plurality of cleaning heads attaches to the first end of the pipe;
wherein the fourth end of the hose attaches to the first connector.

10. The water treatment apparatus according to claim 9
wherein the first connector attaches to the second connector of the housing;
wherein the pipe and the hose draw and transport water from the aquarium through the scrubbing device into the second connector;
wherein the cleaning head selected from the plurality of cleaning heads is inserted into the water contained within the aquarium and is rubbed against a wall or corner selected from the plurality of walls or corners of the aquarium;
wherein is captured along with the water drawn by the pump through the pipe and the hose into the housing where the algae will be removed by the filtration unit.

11. The water treatment apparatus according to claim 10
wherein the plurality of cleaning heads further comprises a vacuum head, a scrubbing brush, and a polishing and scrubbing brush;
wherein the vacuum head is a hollow tapered structure;
wherein the scrubbing brush is a brush through which the water is drawn into the scrubbing device;
wherein the polishing and scrubbing brush is a soft filtering structure through which the water is drawn into the scrubbing device.

12. The water treatment apparatus according to claim 11
wherein the filtration unit further comprises a filter chamber, one or more filter media, and a filter intake and a filter outlet;
wherein the filter chamber is a hollow rectangular block through which the water is filtered;
wherein each of the one or more filter media is a filtering medium;
wherein water is pumped into the filtration unit through the filter intake;
wherein water processed by the one or more filter media flows through the filter outlet into the exit port.

13. The water treatment apparatus according to claim 12 wherein the one or more filter media comprises a bonded filter pad and an activated carbon filter media.

14. The water treatment apparatus according to claim 13 wherein the filtration unit is a gravity fed particulate filter.

15. The water treatment apparatus according to claim 14 wherein the pipe is selected from the group consisting of a rigid structure or semi-rigid elastic structure.

16. The water treatment apparatus according to claim 15 wherein hose is flexible structure.

17. The water treatment apparatus according to claim 16 wherein the pump is sized to pump between two gallons and three gallons per minute inclusive.

* * * * *